(12) United States Patent
Iyengar

(10) Patent No.: US 6,351,561 B1
(45) Date of Patent: Feb. 26, 2002

(54) GENERATING DECISION-TREE CLASSIFIERS WITH OBLIQUE HYPERPLANES

(75) Inventor: Vijay Sourirajan Iyengar, Cortlandt Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/276,876

(22) Filed: Mar. 26, 1999

(51) Int. Cl.$^7$ .............................. G06K 9/68; G06K 9/62; G06F 7/00
(52) U.S. Cl. ..................... 382/226; 382/228; 707/102
(58) Field of Search .................... 382/226, 227, 382/228, 224, 225; 706/20; 707/1, 3, 6, 102

(56) References Cited

U.S. PATENT DOCUMENTS

| | | | |
|---|---|---|---|
| 4,719,571 A | * 1/1988 | Rissanen et al. | 707/101 |
| 5,634,087 A | * 5/1997 | Mammone et al. | 706/25 |
| 5,787,274 A | 7/1998 | Agrawal et al. | 707/102 |
| 5,864,839 A | * 1/1999 | Bourgoin | 707/1 |
| 6,003,029 A | * 12/1999 | Agrawal et al. | 707/7 |
| 6,009,199 A | * 12/1999 | Ho | 382/224 |

OTHER PUBLICATIONS

Sankar et al, "Growing and Pruning Neural Tree Networks"; IEEE Paper ISBN: 0018–9340, vol. 42, No. 3, pp. 291–299, Mar. 1993.*

Sanchez et al, "A Voronoi–Diagram–Based Approach to Oblique Decision Tree Induction", IEEE Paper ISBN: 0–8186–8512–3, vol. 1, pp. 542–544, Aug. 1998.*

Subramanian et al, "Converting Discrete Images to Partitioning Trees"; IEEE Paper ISBN: 1077–2626, vol. 3, No. 3, pp. 273–288, Sep. 1997.*

Shim et al, "High–Dimensional Similarity Joins"; IEEE Paper ISBN: 08186–7807–0, pp. 301–311, Apr. 1997.*

"A System for Induction of Oblique Decision Trees", S.K. Murthy et al., Journal of Artificial Intelligence Research 2 (1994), pp. 1–32.

"Induction of Oblique Decision Trees", D. Heath et al., Dept. of Compuer Science, The Johns Hopkins University, Baltimore, MD 21218, (6 pages).

"Oblique Linear Tree", S. Liu et al., Advances in Intelligent Data Analysis, Lecture Notes in Computer Science, Second Int'l. Symposium, IDA–97, London, U.K., Aug. 1997, p. 187–198.

* cited by examiner

*Primary Examiner*—Amelia M. Au
*Assistant Examiner*—Mehrdad Dastouri
(74) *Attorney, Agent, or Firm*—Louis P. Herzberg

(57) ABSTRACT

A method and apparatus is disclosed for generating a decision tree classifier with oblique hyperplanes from a training set of records. The method iteratively comprises the steps of: initializing a set of vectors to the numeric attribute axes; creating a decision tree classifier using hyperplanes orthogonal to the set of vectors; checking if the iteration stopping criteria has been reached; computing a new set of vectors if the iteration proceeds; and choosing the best decision tree when the iteration is stopped. The vectors used are not restricted to the attribute axes and hence oblique hyperplanes are allowed to split nodes in the generated decision tree. The computation of the new vector set uses the decision tree produced in the latest iteration. The leaf nodes of this tree are considered pair-wise to compute the new vector set for use in the next iteration. The iterative process produces a set of decision trees from which the best one is chosen as the final result of the method.

44 Claims, 5 Drawing Sheets

GENERATING DECISION-TREE CLASSIFIERS WITH OBLIQUE HYPERPLANES

CROSS REFERENCES

The present application is related to the following applications even dated herewith: Ser. No. 09/276,870, entitled, "Generating Regression Trees With Oblique Hyperplanes," by inventor Vijay Iyengar, which is incorporated herein by reference in entirety.

FIELD OF THE INVENTION

This invention relates to the field of data processing. It is more specifically directed to the field of computer data mining. More particularly, the invention relates to methods and apparatus for generating a decision tree classifier with oblique hyperplanes from data records.

BACKGROUND OF THE INVENTION

Data mining is the search for valuable information from data. Classification is a form of data mining in which relationships are learned between a set of attributes and a set of predetermined classes. This relationship is represented in a classifier. Various phenomena can be represented by such relationships. Examples of such phenomena can be found in the financial domain, insurance domain and in the medical domain. The dependence of an individual's credit worthiness on various characteristics like salary, years in the job, amount of debt, value of assets and so on is an example of a phenomena. The characteristics like salary, years in the job are attributes. Possible class labels include "credit worthy" and "credit risk". In the medical domain, dependence of the outcome on various tests, treatments and patient characteristics is another example of a phenomena. The process of generating a classifier uses input data, herein referred to as a training set, which includes multiple records. Each record has values for various attributes, and has a unique and discrete valued class label. The number of attributes are referred to as the dimensionality of the attribute space. Generally each attribute is also referred to as a dimension. Attributes can be categorical or numeric in nature. This invention relates to numeric attributes. Classification has wide applications in various domains.

Classification has been studied extensively within several disciplines, including statistics, pattern recognition, machine learning, neural networks and expert systems. Known classification techniques include statistical algorithms, decision trees, rule induction, neural networks, and genetic algorithms. The desired qualities for classification include prediction accuracy, speed of classification and understandability, and intuitiveness of the classification result.

The decision tree based method is chosen as an example basis for this invention because of its superior speed of classification and scalability to high dimensional problems with large training sets. Decision tree classifiers can be separated into two forms depending on the nature of the test at each node of the tree. The simplest form of decision trees has a test of the form $(x_i \leq b)$, where $x_i$ is the value in the i-th numeric dimension and b is some constant. A more complex form of decision tree allows linear combinations of the attributes in the test at each node. In this case, the test is of the form $(a1.x1+a2.x2+ \ldots +an.xn \leq b)$.

These trees, also called oblique trees or trees using oblique hyperplanes, produce better results for some problem domains. This was discussed and demonstrated in "*Classification and Regression Trees,*" Breiman et. al., Chapman and Hall/ CRC, 1984, which is hereinafter referred to as "CART". In such domains oblique trees produce compact solutions with higher accuracy. While these are advantageous, the generation of these oblique trees is difficult because of the difficulty in determining the equation for the complex test at each node.

Some oblique tree generation methods use a particular form of an optimization technique to determine the test at each node. These methods are complex and tend to be computationally intensive without any guarantee of improved accuracy. Another method uses the statistical technique of linear discriminants in the construction of oblique decision trees. This technique often reduces the time taken to generate the oblique trees. However, the resulting trees are usually quite complex and there is still room for improvement in the classification accuracy.

SUMMARY OF THE INVENTION

It is therefore an aspect of the present invention to present a method and apparatus for generating a decision tree classifier with oblique hyperplanes from data records. In an embodiment the classifier is generated using an iterative method wherein for each iteration a set of vectors is provided to a decision tree generating process. The decision tree generated uses hyperplanes orthogonal to the vectors provided in the set to separate records at each of its node. The iterative process starts out with the set of numeric attribute axes as the set of vectors. At the end of each iteration pairs of leaf nodes in the generated tree are considered and analyzed to determine new vectors. The set of vectors for the next iteration is determined using a filter process. This iterative process generates multiple decision trees from which one tree is chosen as a solution meeting a particular criteria.

BRIEF DESCRIPTION OF THE DRAWINGS

These and other objects, features, and advantages of the present invention will become apparent upon further consideration of the following detailed description of the invention when read in conjunction with the drawing figures, in which.

DETAILED DESCRIPTION OF THE INVENTION

This invention provides a method and apparatus for generating a decision tree classifier with oblique hyperplanes from data records. Use of oblique hyperplanes or the linear combination tests at nodes in the decision tree is known to be better suited to some problem domains but such trees are also difficult to generate. The invention includes an iterative method for generating such trees which is relatively computationally inexpensive and provides more accurate and intuitively understandable solutions for many problems.

In an example embodiment of the invention, the iterative method starts out with the numeric attribute axes as a starting set of vectors and uses the hyperplanes orthogonal to these vectors in the decision tree generating process. Any decision tree generating process may be used or adapted for this task. The resultant tree is used to generate a new set of vectors. Computation of the new set of vectors is performed using the leaf nodes in the tree generated in the latest iteration. Pairs of leaf nodes are considered and analyzed to determine one or more new vectors. The resulting vectors are filtered to get a new set that is then used for the next iteration. This iterative process continues until a stopping criteria is reached. When the process stops, one of decision trees generated in one of the iterations is chosen as a final solution from this method.

Figure 1:
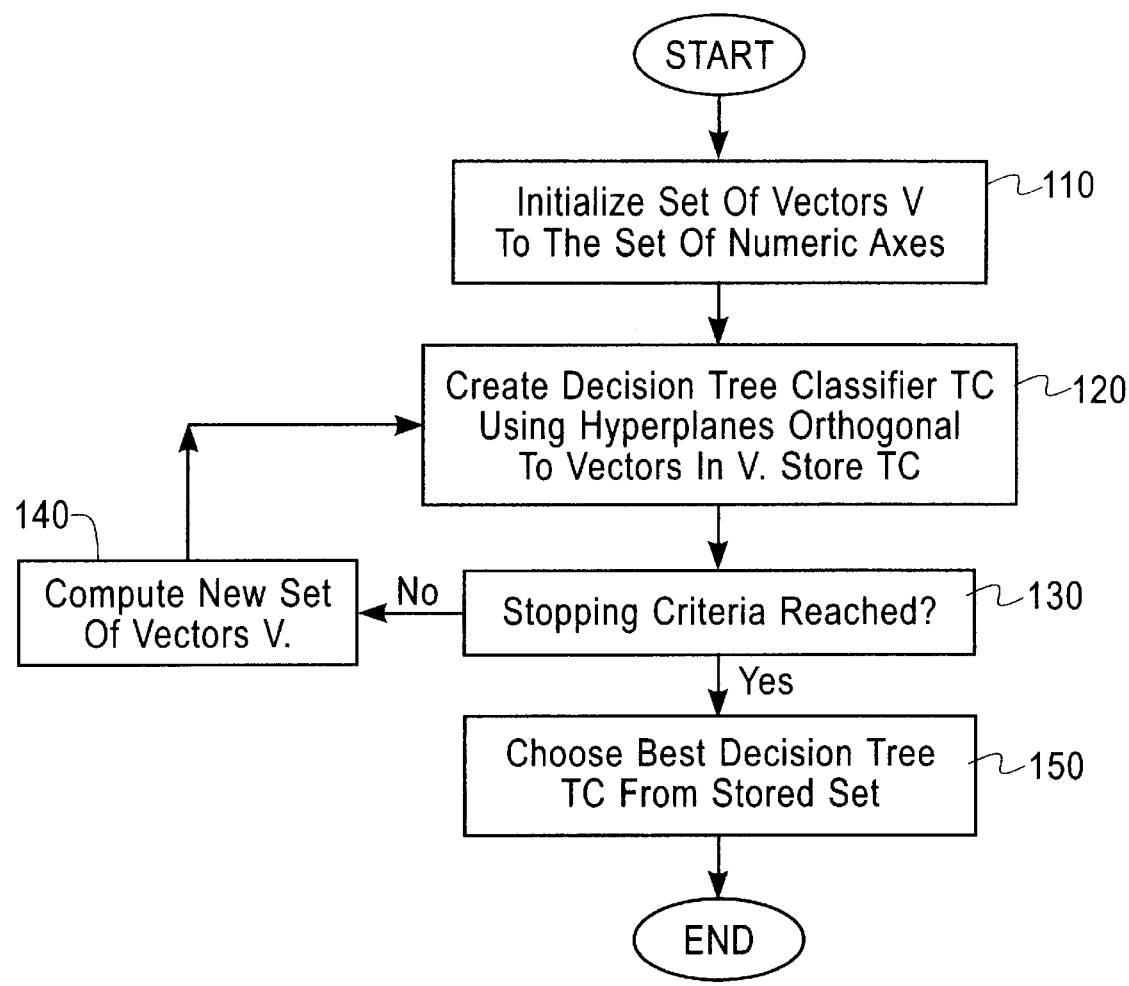
FIG. 1 shows is a flow chart showing the overall operation of a method of the present invention.

FIG. 1 shows a flow diagram for an example method for generating a decision tree classifier using oblique hyperplanes. Beginning with block 110, the method first initializes a set of vectors 'V'. Each vector in n-dimensional numeric attribute space is specified by an equation of the form $$(c1.x1+c2.x2 \ldots +cn.xn),$$

where $$(c1,c2, \ldots cn)$$

are the coefficients for coordinates along each of the numeric axes $$(x1,x2, \ldots ,xn),$$

respectively. Scaling all the coefficients by multiplying all of them by a constant does not change the vector. Hence, the coefficients are scaled such that the sum of their absolute values is 1. Alternate embodiments employ other scalings to obtain other properties without affecting this invention.

A vector is useful in defining a family of hyperplanes that are orthogonal to it. The initial set 'V' created in block 110 contains one vector for each of the numeric axes. Hence, this initial set 'V' has 'n' vectors in it where each vector has exactly one coefficient with value '1' and all the others have value '0'. Each vector in the initial set 'V' has a non-zero coefficient 'ci' for the coordinate 'xi' along a unique numeric attribute. At block 120, the hyperplanes orthogonal to each of the vectors in the set V are used to create a decision tree classifier 'TC'.

Figure 2:
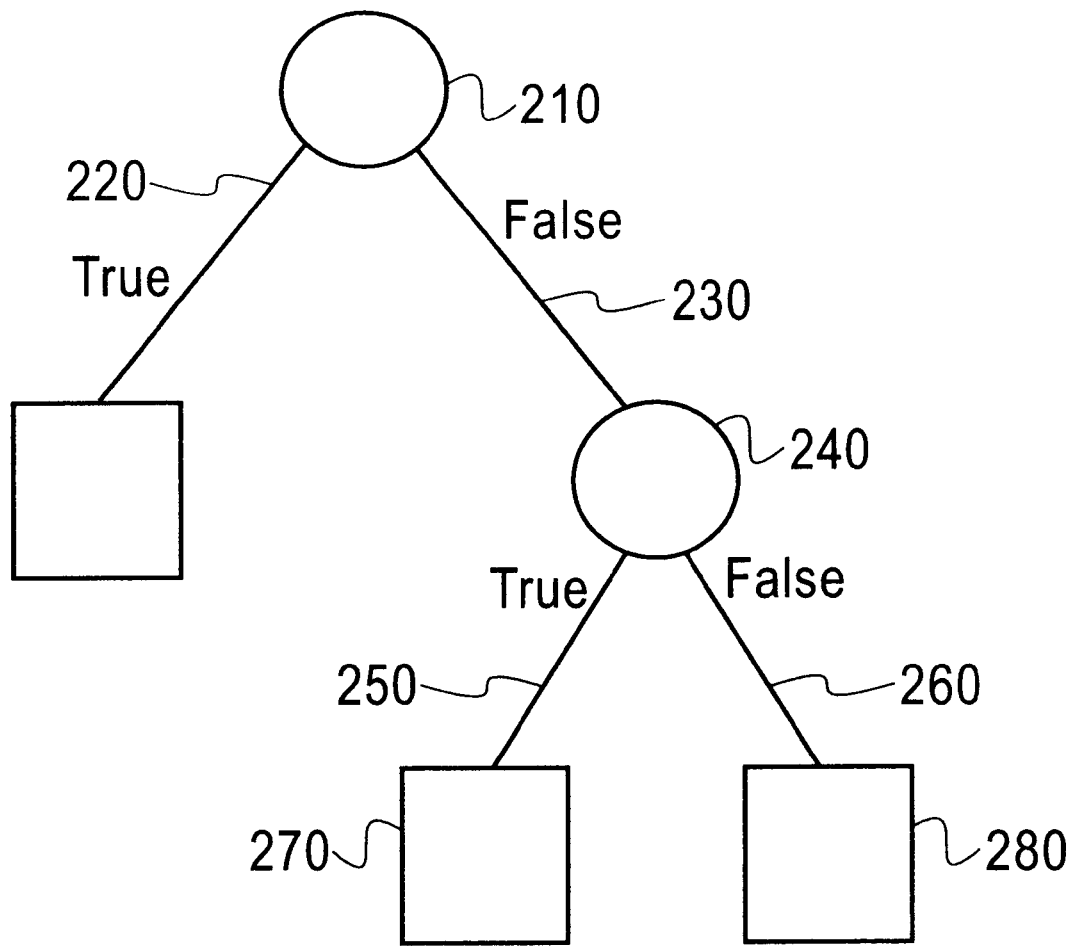
FIG. 2 illustrates an example of a binary decision tree where each leaf node represents a class of records.

An example of a decision tree 'TC' is illustrated in FIG. 2. The decision tree consists of nodes and branches, such as internal node 240 and branch 230. Each node makes a single test or decision wherein an outcome can be either true or false which then leads to the corresponding child node. The starting node 210 is referred to as the root node of the tree. Each particular node that is not a terminal node splits into two child/internal nodes which are reached based on an outcome of the test on the particular node. For example node 240 splits into nodes 270 and 280. Node 270 is reached if a test on node 240 is true 250. Node 280 is reached if a test on node 240 is false 260. Following along the branches of the tree based on the outcome of the test at each node, a leaf or terminal node is reached, for example leaf node 280, which determines the record class assignment.

Trees that use oblique hyperplanes, allow tests at each node of the form $$(a1.x1+a2.x2 \ldots +an.xn \leq b),$$

where $$a1,a2, \ldots an, \text{ and } b$$

are numeric constants. A decision tree built in block 120 of FIG. 1 is allowed to use any of the vectors in the set V for the test in any tree node. Therefore the constants $$(a1,a2 \ldots , an)$$

in the test at each node are the set of coefficients $$(c1,c2, \ldots , cn)$$

of the vector chosen at that node. The constant b is chosen by the procedure used in block 120 to create a decision tree classifier.

One embodiment of block 120 uses the method for generating a decision tree classifier disclosed in U.S. Pat. No. 5,787,274 dated Jul. 28, 1998. This method only allows hyperplanes that are orthogonal to the axes and therefore the tests at any node are restricted to being of the form $$(ai.xi \leq b).$$

In accordance with the present invention, this method is extended to allow more general tests due to oblique hyperplanes. The cost of encoding the test at a node $L_{test}$ is changed from what is used in U.S. Pat. No. 5,787,274. The extended method of determining $L_{test}$ for an internal node N uses $$L_{test}=1+\beta.[\text{weight}(v)-1],$$

where v is the vector used for the test at the node N. In an embodiment the value for the weight factor $\beta$ is 1. Alternate embodiments use fractional values for $\beta$ which imply lower costs for the complex tests and tend to generate bigger trees. Any function weight(v) that computes the number of significant non zero coefficients in the vector v can be used.

An embodiment employs a method of computing the weight function for the vector v $$(c1.x1+c2.x2 \ldots +cn.xn)$$

as follows. For each attribute dimension the standard deviation is computed for the coordinates in that dimension in the training set of records. This is denoted by std_dev (i) for the dimension xi. The product ci.std_dev (i) is computed for each attribute dimension and the maximum product value is denoted as Pmax. Each attribute dimension which has a product value within some user defined percentage p of Pmax is considered significant and contributes 1 to the weight(v). Insignificant attribute dimensions do not contribute to the weight function.

Other embodiments are possible for block 120, wherein any method for generating decision tree classifiers can be used in the procedure. For example, the decision tree classifier called CART as described by Brieman et. al in *Classification and Regression Trees,* Chapman & Hall/CRC, 1998 can be used in block 120. The only requirement for the method used in block 120 is that it can allow oblique hyperplanes to split nodes.

At block 130 of FIG. 1, a check is made to see if the stopping criteria has been reached. One embodiment for block 130 uses a user specified limit on the number of iterations through the blocks 120, 130 and 140. Typical values for this limit are less than 5. Another embodiment for block 130 uses the misclassification errors and the tree sizes achieved in each iteration to determine when to stop the iteration. For example, worsening of these quantities by some user specified amount is sometimes used as a stopping criteria.

Figure 3:
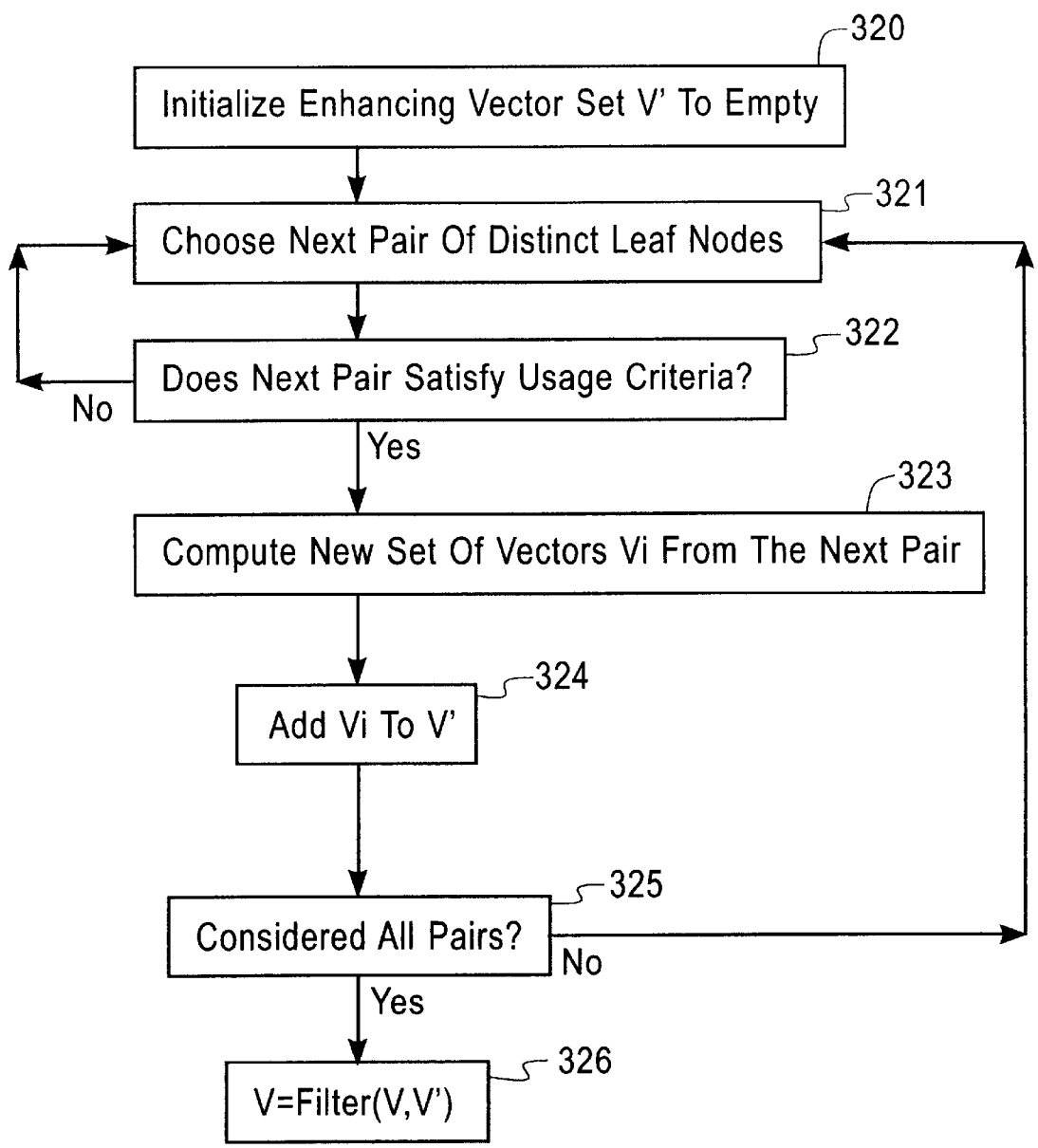
FIG. 3 is a flow chart showing the operation of an embodiment for block 140 of FIG. 1, for the computation of a new set of vectors V in accordance with the present invention.

At block 140 of FIG. 1, a new set of vectors V is computed for use in the next iteration. FIG. 3 shows a preferred embodiment for block 140 in FIG. 1. The computation of the new set of vectors V begins at block 320 in FIG. 3 with a vector set V' being initialized to being empty. The set V' as defined herein is referred to as the enhancing vector set. In block 321, a new pair Pi of distinct leaf nodes (Lj, Lk) is chosen from the decision tree TC generated in the last iteration. If there are m leaf nodes in TC, there are $$(m \times (m-1))/2$$

possible distinct pairs to consider.

At block 322 in FIG. 3, a check is made to see if the chosen pair of leaf nodes Pi=(Lj, Lk) satisfies the criteria for being used in the new vector set computation. In general, the criteria for the check in block 322 can use any characteristic for the leaf nodes Lj and Lk.

An embodiment for this step of checking is based on the number of training records Nj and Nk covered in the leaf nodes Lj and Lk, respectively. A pair (Lj, Lk) can fail the check if either one of Nj or Nk is smaller than some user defined threshold size, SIZE1. A pair (Lj, Lk) can also fail the check if both Nj and Nk are smaller than another user defined threshold size, SIZE2.

Another embodiment requires that the dominant classes in Lj and Lk be distinct to satisfy the check in block 322.

Another embodiment uses a function that determines whether or not Lj and Lk are adjacent. It requires that Lj and Lk be adjacent to satisfy the check in block 322. Various forms of adjacency can be used. One embodiment is to consider two leaf nodes Lj and Lk adjacent, if their boundaries share at least one point in the multidimensional attribute space. This is determined by using linear programming to solve the constraints for the space defined by each leaf node Lj, Lk. The set of constraints for each leaf node are determined by traversing the path from the root of the tree to the leaf node and adding the constraint due to the test at each encountered node to the set of constraints. If a node with the test $$(a1.x1+a2.x2 \ldots +an.xn \leq b)$$

is encountered with the test being successful in this traversal, then the constraint $$(a1.x1+a2.x2 \ldots +an.xn \leq b)$$

is added to the set of constraints. If a node with the test $$(a1.x1+a2.x2 \ldots +an.xn \leq b)$$

is encountered with the test failing in this traversal, then the constraint $$(a1.x1+a2.x2 \ldots +an.xn \geq b)$$

is added to the set of constraints. Various embodiments are possible by combining the size checks with checks of adjacency and the check for distinct dominant classes.

At block 323 in FIG. 3, a set of vectors Vi is computed from the pair of leaf nodes Pi=(Lj, Lk).Vi as defined herein is refered to as a separating set of vectors. In general, this computation has the form $$Vi=\text{compute\_vectors}(Lj, Lk),$$

where compute_vectors is a function that uses characteristics of leaves Lj and Lk. One embodiment computes one vector v from each pair (Lj, Lk) as follows. Considering the leaf node Lj, the training records covered by Lj that have the dominant class label in Lj are collected in a set R. For all the numeric attribute dimensions the averages of the coordinates of the training records in R in each of the dimensions are computed as $$(g1,g2, \ldots gn).$$

Let (h1, h2, . . . ,hn) be the computed values for Lk using the same method. The single vector v in Vi is computed as $$(g1-h1, g2-v2, \ldots ,gn-vn).$$

Still another embodiment includes all the training records in Lj and Lk in the computation of the average. Another embodiment uses the boundaries for Lj and Lk, as described in the embodiments for block 322, to determine the geometric centers $$(q1,q2, \ldots ,qn)$$

and $$(r1,r2, \ldots ,rn)$$

for Lj and Lk, respectively and then computing the vector v as $$(q1-r1,q2-r2, \ldots ,qn-rn).$$

One method of approximating the geometric center is to average the coordinates of uniformly placed records in the leaf nodes Lj and Lk.

Other embodiments compute a vector v first as described above and then use a significance test to determine which coefficients of v are not significant. These insignificant coefficients are forced to be zero and then the resultant vector v is added to Vi. Combinations of these methods are also used to generate multiple vectors in Vi. Alternatively, coefficients of a computed vector v can be perturbed by small amounts to generate other vectors in Vi. The vector set Vi is added to the set of vectors V' in block 324 to generate the adjusted set of vectors.

Block 325 in FIG. 3 ensures that all pairs of distinct leaf nodes have been considered before going to block 326. In block 326 a filtering process is applied to generate the set of vectors V. The filter function in block 326 uses the last set of vectors V and the newly generated vector set V' to generate the set of vectors V for the next iteration. In general, this function can use any characteristic of the vectors and the vector sets V and V' to generate the final vector set V.

An advantageous embodiment is to add the sets V and V' to generate the new vector set V. Another embodiment is to first remove from V all vectors except those that correspond to the numeric attribute axes, and then add the vectors from V' to V. Still another embodiment includes additional filtering using a measure of redundancy such that if two vectors have very similar coefficients only one representative vector remains to represent both. Filtering can also include reinitializing the set of vectors to some predetermined set.

At block 150 in FIG. 1, one of the decision tree classifiers 'TC' created and stored in block 120 inside the iterative loop is chosen. One embodiment for this choice is based on using a separate set of records called the validation set. The accuracy and tree size on this validation set of records is used to choose the best decision tree classifier. In the absence of a validation set the accuracy and tree size on the training set of records is used.

Thus, in a particular embodiment, the invention provides a method for generating a decision-tree classifier from a training set of records that includes: providing each record with at least one attribute with numerical values and a class label; initializing a set of vectors V to include one vector for each numeric attribute wherein an initial set is denoted V0; initializing phase to 1, where phase is the number of the iteration; creating a decision tree classifier from the training set of records using hyperplanes orthogonal to the set of vectors; reinitializing V to V0; considering pairs of regions wherein each region of a pair corresponds to a leaf node in the decision tree created; discarding from consideration pairs of regions based on a size and/or an adjacency criterion; computing for each non-discarded pair of regions a new vector using a function of the shape and extent of the two regions, adding this vector to the set V; and repeating the steps of creating, reinitializing, considering, discarding, computing, and adding until phase equals a user specified maximum phase. This generates the decision-tree classifier using oblique hyperplanes.

In another embodiment, the invention provides a method for generating a decision-tree classifier from a training set of records that includes: providing each record with at least one attribute with numerical values and a class label; initializing a set of vectors V to include one vector for each numeric attribute, wherein an initial set of vectors is denoted V0; and initializing phase to 1, where phase is the number of iteration; and creates a decision tree classifier from the training set of records using hyperplanes orthogonal to the set of vectors.

In some embodiments, the method also includes: considering pairs of regions wherein each region of a pair corresponds to a leaf node in the decision tree created; discarding from consideration pairs of regions based on a size and/or an adjacency criterion; computing for each non-discarded pair of regions a new vector using a function of the shape and extent of the two regions; adding this vector to the set V; and repeating the steps of creating, reinitializing, considering, discarding, computing, and adding until phase equals a user specified maximum phase. This generates a decision-tree classifier using oblique hyperplanes.

The initial set of vectors for constructing hyperplanes to separate training set records is a set of numeric attribute axes. In one embodiment the creating of the decision tree uses the method disclosed in U.S. Pat. No. 5,787,274. It uses the MDL principle with a modification for handling oblique hyperplanes. This modification employs the equation below to determine the cost of the test at an internal node.

Test cost (internal node)=1+β[weight(vector used for the split at the internal node)−1], where the weight of the vector is a number of non-zero coefficients for the various numeric attributes in the equation of the vector and the weight factor β is chosen by the user. A beneficial value for β is 1.

An alternate embodiment creates the decision trees using the Classification and Regression Trees (CART) procedure of constructing decision trees.

The portion of the multidimensional attribute space covered by a leaf node in the decision tree is referred to as a region. Pairs of regions are considered to compute new vectors to be used in the next phase of the invention. A pair of regions may be discarded from consideration if either region has size smaller than a user defined minimum, where size of a region is defined to be the number of training set records contained in the region or equivalently the corresponding leaf node. A pair of regions may also be discarded from consideration if neither region has at least another user defined minimum size. A pair of regions may be discarded from consideration if both regions in the pair have the same dominant class. For each pair of regions considered, one embodiment for the step of computing involves computing the centroid of each region in the pair and then computing a new vector formed by joining the two centroids. This new vector is added to the set of vectors V. Another embodiment uses only those training records that have the dominant class label in the region for the centroid calculation. Another embodiment for computing the new vector uses geometrical attributes of the regions.

The number of phases is user specified and is typically in the range 2–3. A vector is considered for possible splits at a node if the weight of the vector is not greater than the product of a size factor and the number of training records in the node. A typical value for the size factor is 0.5.

Figure 4:
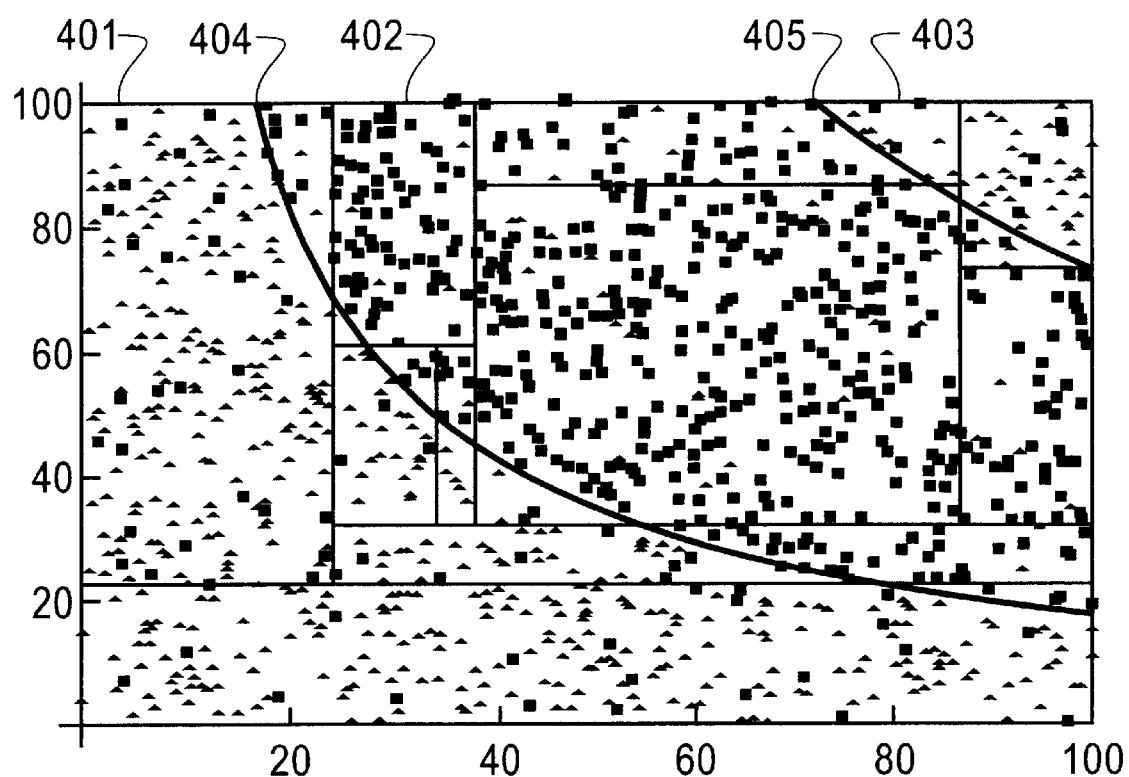
FIG. 4 illustrates results obtained on an example data set employing a decision tree classifier using hyperplanes orthogonal to the attribute axes to split at each node in the tree.
Figure 5:
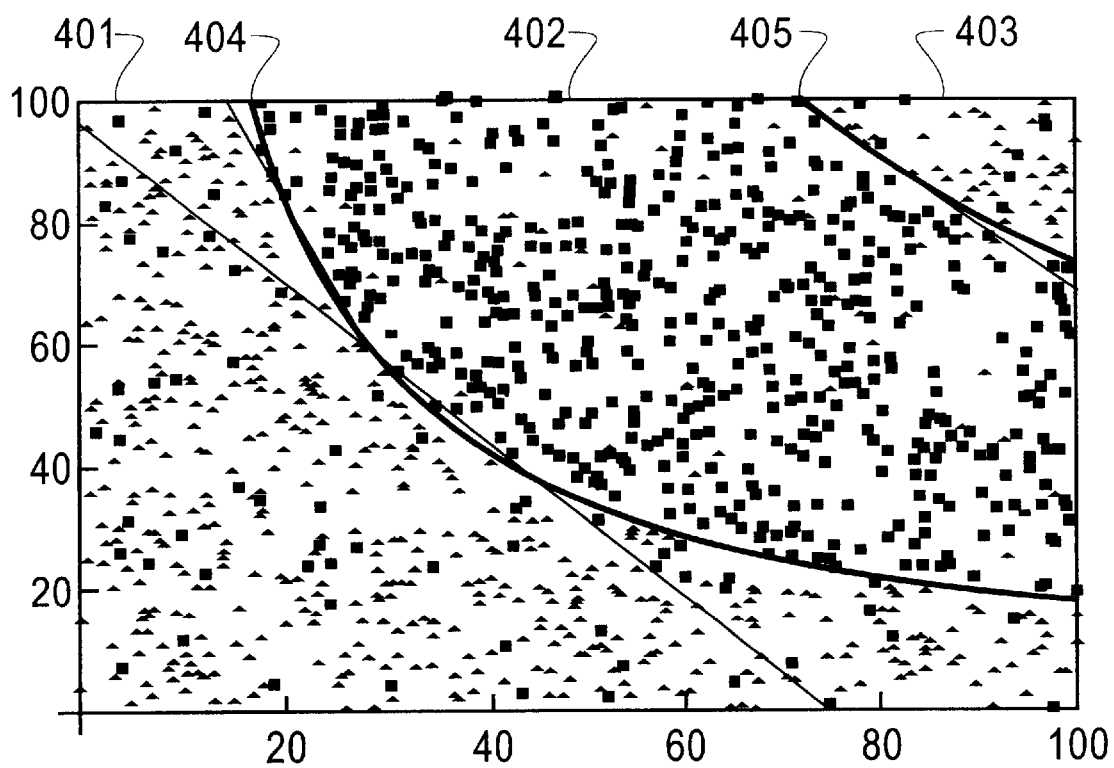
FIG. 5 illustrates results obtained on the example data set of FIG. 4 employing a decision tree classifier using oblique hyperplanes in accordance with the present invention.

FIGS. 4 and 5 show results obtained from an example data set without and with using the method of the present invention respectively. This example data set is assumed to have two numeric attribute dimensions with values in the range 0 to 100, two classes A and B, and a data error of 10%. Records in the training set with class label A are shown as small triangles in both FIGS. 4 and 5. Training records with class label B are shown as squares in both FIGS. 4 and 5. Two thick contour lines 404 405 separate the three areas 401–403 of the two dimensional space. Contour line 404 separates the first area 401 from the second area 402. Contour line 405 separates the second area 402 from the third area 403. Two of these areas 401 403 have predominantly records of class label A and one area 402 has predominantly records of class label B.

FIG. 4 illustrates results obtained on the example data set employing a decision tree classifier using only hyperplanes that are orthogonal to the attribute axes to split the data set at each node in the tree. FIG. 4 show these results as a plurality of rectangular region enclosed by thin solid lines. Each thin solid line is orthogonal to one of the attribute axes. The thin solid lines enclosed rectangular regions which correspond to a leaf node in the resultant tree. Each rectangular region has a unique class label corresponding to the class label dominant amongst the records in that region. This provides a classifier solution which approximates the areas separated by the thick contour lines 404 405 using a staircase-like pattern along the thin solid lines of the rectangular regions. The resultant calculated misclassification error is 14.3%.

FIG. 5 illustrates results on the same example data set of FIG. 4 employing a decision tree classifier allowing the use of oblique hyperplanes in accordance with the present invention. The regions corresponding to the leaves are again enclosed by thin solid lines shown in the figure. Unlike the case in FIG. 4 these thin solid lines are not constrained to be orthogonal to an attribute coordinate axis. These thin solid lines are allowed to be oblique in accordance with the present invention. The resulting decision tree using these oblique hyperplanes has five leaf nodes which result in five corresponding regions in FIG. 5. The four triangular regions have the dominant class label A, and the fifth region has the dominant class label B. It is clear from FIG. 5 that the regions in this decision tree solution approximate the areas 401–403 separated by the thick contour lines 404 405 much better than the solution shown in FIG. 4. This is also reflected in an improved calculated misclassification error of only 11.1%.

It is noted that although the description of the invention is made for particular arrangements of steps, the intent and concept of the present invention are suitable and applicable to other arrangements. Thus the invention may be implemented with an article of manufacture comprising a computer usable medium having computer readable program code means embodied therein for causing the generation of a decision-tree classifier from a training set of records. The computer readable program code means in the article of manufacture comprising computer readable program code means for causing a computer to effect the methods of the present invention. The invention may be implemented with a program storage device readable by machine, tangibly embodying a program of instructions executable by the machine to perform method steps for generating a decision-tree classifier from a training set of records. Similarly, the invention may be implemented with a computer program product comprising a computer usable medium having computer readable program code means embodied therein for causing generation of a decision tree. The computer readable program code means in the computer program product comprising computer readable program code means for causing a computer to effect the methods of the present invention. It will thus be clear to those skilled in the art that other modifications to the disclosed embodiments can be effected without departing from the spirit and scope of the invention.

What is claimed is:

1. A method for generating a decision-tree classifier from a training set of records, the method comprising:

providing each record with at least one attribute with numerical values and a class label;

initializing a set of vectors V to include one vector for each numeric attribute wherein an initial set is denoted V0, and initializing phase to 1;

creating a decision tree classifier from the training set of records using hyperplanes orthogonal to the set of vectors;

reinitializing V to V0;

considering pairs of regions wherein each region of a pair corresponds to a leaf node in the decision tree created;

discarding from consideration pairs of regions based on a size and/or an adjacency and/or a dominant class label criterion;

computing for each non-discarded pair of regions a new vector using a function of the shape and extent of the regions;

adding this vector to the set V; and repeating the steps of creating, reinitializing, considering, discarding, computing, and adding until phase equals a user specified maximum phase, thereby generating the decision-tree classifier.

2. A method for generating a decision-tree classifier from a training set of records, the method comprising:

providing each record with at least one attribute with numerical values and a class label;

initializing a set of vectors V to include one vector for each numeric attribute, wherein an initial set of vectors is denoted V0, and initializing phase to 1;

creating a decision tree classifier from the training set of records using hyperplanes orthogonal to the set of vectors;

considering pairs of regions wherein each region of a pair corresponds to a leaf node in the decision tree created;

discarding from consideration pairs of regions based on a size, and/or an adjacency criterion, and/or a dominant class label;

computing for each non-discarded pair of regions a new vector using a function of the shape and extent of the regions;

adding the new vector to the set V; and repeating the steps of creating, reinitializing, considering, discarding, computing, and adding until phase equals a user specified maximum phase, thereby generating the decision-tree classifier.

3. A method as recited in claim 2, wherein the decision-tree classifier is an oblique decision-tree classifier.

4. A method as recited in claim 2, wherein the initial set of vectors for constructing hyperplanes to separate training set records is a set of numeric attribute axes.

5. A method as recited in claim 2, wherein the weight of each vector in the set of vectors corresponds to the number of non-zero coefficients for the various numeric attributes in an equation of said each vector.

6. A method as recited in claim 2, wherein the decision tree construction uses an MDL principle with a modification for handling oblique hyperplanes.

7. A method as recited in claim 6, wherein the modification is such that a cost of encoding a test at an internal node is given by an equation:

$$1+\beta*(\text{weight}(\text{a vector used for splitting at the node})-1).$$

8. A method as recited in claim 2, wherein the step of creating employs a Classification and Regression Trees (CART) procedure of constructing decision trees.

9. A method as recited in claim 2, wherein the region in the step of considering is defined by a leaf in the decision tree.

10. A method as recited in claim 2, wherein the step of discarding employs a particular criterion wherein size of the region is defined to be equal to a number of training set records contained in the region.

11. A method as recited in claim 10, wherein any region smaller than a user defined minimum size is discarded from consideration in any pair.

12. A method as recited in claim 10, wherein at least one of the regions in the pair is required to have another user defined size.

13. A method as recited in claim 2, wherein the step of computing includes:

computing a centroid of each of the regions in a pair, forming the new vector by joining the centroids resulting from the step of computing a centroid, and adding the new vector to the set V.

14. A method as recited in claim 13, wherein computing the centroid uses only those training records in the region that have a dominant class label in the region.

15. A method as recited in claim 2, wherein the step of computing uses geometrical attributes of the regions.

16. A method as recited in claim 2, wherein a number of phases is user specified.

17. A method as recited in claim 16, wherein the number of phases is specified to be in the range of 2–3.

18. A method as recited in claim 7, wherein the $\beta$ is 1.

19. A method as recited in claim 6, wherein a weight of any vector considered for splitting at a node is not greater than the product of a size factor times a number of training records in the node.

20. A method as recited in claim 19, wherein the size factor is 0.5.

21. A method comprising:
providing a training set of records, each record having at least one attribute and a class label representing a phenomenon;
forming an initial set of vectors of said attributes;
applying hyperplanes which are orthogonal to the initial set of vectors to obtain a first decision tree for at least one subset of the training set;
testing whether the first decision tree meets a criterion;
if criterion is not met:
calculating for at least a subset of pairs of leaves on the decision tree a modified set of vectors; and
creating a modified decision tree from the modified set of vectors;
wherein the step of applying employs a method based on a minimum description length principle; and
wherein a cost of encoding a test at an internal node of a tree is given by the sum of unity and the product of a weight factor multiplied by a weight of a vector used in the internal node minus unity.

22. A method as recited in claim 21 further comprising:
storing the modified decision tree;
testing whether the modified decision tree meets the criterion; and
repeating the steps of calculating, creating, storing and testing until the modified decision tree meets the criterion.

23. A method as recited in claim 22, further comprising:
examining each of the decision trees for a desired property, and
selecting a best decision tree based on the results of the step of examining.

24. A method as recited in claim 22, further comprising applying one of the decision trees to a set of new records to develop a particular class label for each of the new records.

25. A method as recited in claim 21, wherein the step of forming employs one vector for each attribute, said one vector having a non-zero coefficient only for values of said each attribute.

26. A method as recited in claim 21, wherein the criterion is a measure of a classification error.

27. A method as recited in claim 21, wherein the criterion is a resulting size of the decision tree.

28. A method as recited in claim 21, wherein the step of testing is performed on records in the training set not included in said at least one subset.

29. A method as recited in claim 21, wherein the step of applying employs CART.

30. A method as recited in claim 21, wherein at least one attribute is numeric.

31. A method as recited in claim 21, wherein the phenomenon is finance related.

32. A method as recited in claim 31, wherein the phenomenon is credit worthiness.

33. A method comprising:
providing a training set of records, each record having at least one attribute and a class label representing a phenomenon;
forming an initial set of vectors of said attributes;
applying hyperplanes which are orthogonal to the initial set of vectors to obtain a first decision tree for at least one subset of the training set;
testing whether the first decision tree meets a criterion;
if criterion is not met:
calculating for at least a subset of pairs of leaves on the decision tree a modified set of vectors; and
creating a modified decision tree from the modified set of vectors;
wherein the step of calculating includes;
(a) initializing an enhancing vector set to empty;
(b) choosing a next pair of distinct leaf nodes;
(c) determining if the next pair satisfies a usage criterion;
(d) repeating steps (b) and (c) until the usage criterion is satisfied;
(e) computing a separating set of vectors for the next pair;
(f) adding the separating set of vectors to the enhancing set of vectors forming an adjusted set of vectors;
(g) repeating steps (b) through (f) for all pairs of leaf nodes; and
(h) filtering all sets of vectors so as to form the modified vector set.

34. A method as recited in claim 33, wherein the usage criterion is a minimum size for each leaf in the pair of leaves and the requirement that the dominant class labels in said each leaf in the pair of leaves be distinct.

35. A method as recited in claim 33, wherein the usage criterion employs distance between the leaves forming the pair of leaves.

36. A method as recited in claim 33, wherein the step of computing includes:
calculating an average of coordinates for each leaf of the pair of leaves; and
computing each separating vector as being a difference of the average between one leaf and the other leaf.

37. A method as recited in claim 36, wherein the step of calculating an average is performed on a portion of the training records.

38. A method as recited in claim 33, wherein the step of filtering performs set addition.

39. An article of manufacture comprising a computer usable medium having computer readable program code means embodied therein for causing the generation of a decision-tree classifier from a training set of records, the computer readable program code means in said article of manufacture comprising computer readable program code means for causing a computer to effect:
providing each record with at least one attribute with numerical values and a class label;
initializing a set of vectors V to include one vector for each numeric attribute wherein
an initial set is denoted V0, and initializing phase to 1;
creating a decision tree classifier from the training set of records using hyperplanes orthogonal to the set of vectors;
reinitializing V to V0;
considering pairs of regions wherein each region of a pair corresponds to a leaf node in the decision tree created;
discarding from consideration pairs of regions based on a size and/or an adjacency criterion;
computing for each non-discarded pair of regions a new vector using a function of the shape and extent of the regions;
adding this vector to the set V; and
repeating the steps of creating, reinitializing, considering, discarding, computing, and adding until phase equals a user specified maximum phase, thereby generating the decision-tree classifier.

40. A program storage device readable by machine, tangibly embodying a program of instructions executable by the machine to perform method steps for generating a decision-tree classifier from a training set of records, said method steps comprising:

providing each record with at least one attribute with numerical values and a class label;

initializing a set of vectors V to include one vector for each numeric attribute, wherein an initial set is denoted V0, and initializing phase to 1;

creating a decision tree classifier from the training set of records using hyperplanes orthogonal to the set of vectors;

considering pairs of regions wherein each region of a pair corresponds to a leaf node in the decision tree created;

discarding from consideration pairs of regions based on a size and/or an adjacency criterion;

computing for each non-discarded pair of regions a new vector using a function of the shape and extent of the regions;

adding this vector to the set V; and repeating the steps of creating, reinitializing, considering, discarding, computing, and adding until phase equals a user specified maximum phase, thereby generating the decision-tree classifier.

41. A computer program product comprising a computer usable medium having computer readable program code means embodied therein for causing generation of a decision tree, the computer readable program code means in said computer program product comprising computer readable program code means for causing a computer to effect;

providing a training set of records, each record having at least one attribute and a class label representing a phenomenon;

forming an initial set of vectors of said attributes;

applying hyperplanes which are orthogonal to the initial set of vectors to obtain a first decision tree for at least one subset of the training set;

testing whether the first decision tree meets a criterion;

if criterion is not met:
calculating for at least a subset of pairs of leaves on the decision tree a modified set of vectors by applying at least one oblique hyperplane; and
creating a Modified decision tree from the modified set of vectors;

wherein the step of applying employs a method based on a minimum description length principle; and wherein a cost of encoding a test at an internal node of a tree is given by the sum of unity and the product of a weight factor multiplied by a weight of a vector used in the internal node minus unity.

42. A computer program product as recited in claim 41, the computer readable program code means in said computer program product further comprising computer readable program code means for causing a computer to effect:

storing the modified decision tree;

testing whether the modified decision tree meets the criterion; and repeating the steps of calculating, creating, storing and testing until the modified decision tree meets the criterion.

43. A computer program product as recited in claim 42, the computer readable program code means in said computer program product further comprising computer readable program code means for causing a computer to effect:

choosing a best decision tree by examining each of the stored decision trees for a desired property, and selecting a best decision tree based on the results of the step of examining.

44. A computer program product as recited in claim 41, the computer readable program code means in said computer program product further comprising computer readable program code means for causing a computer to effect applying one of the decision trees to a set of new records to develop a particular class label for each of the new records.

* * * * *